United States Patent
Emmerson

[15] 3,668,359
[45] June 6, 1972

[54] CLAMPING AND WELDING ASSEMBLY

[72] Inventor: John O. Emmerson, c/o The DSD Company, Bradley Park, West Granby, Conn. 06026

[22] Filed: Jan. 29, 1971

[21] Appl. No.: 110,930

[52] U.S. Cl. ............................. 219/60 A, 219/161, 228/44, 269/275
[51] Int. Cl. ....................................................... B23k 9/02
[58] Field of Search .......... 219/60 A, 60 R, 101, 161, 125 R, 219/124; 228/4, 6, 44; 269/48.1, 275

[56] References Cited

UNITED STATES PATENTS

| | | | |
|---|---|---|---|
| 2,737,140 | 3/1956 | Totten | 219/161 X |
| 3,400,872 | 9/1968 | Rogers | 228/44 |
| 1,477,009 | 12/1923 | Schroder | 219/161 |
| 3,166,664 | 1/1965 | Paton et al. | 219/161 X |
| 1,574,848 | 3/1926 | Peck | 219/161 X |
| 2,800,867 | 7/1957 | Smith | 269/287 X |
| 3,020,041 | 2/1962 | Peterson et al. | 269/275 X |

Primary Examiner—J. V. Truhe
Assistant Examiner—L. A. Schutzman
Attorney—Prutzman, Hayes, Kalb & Chilton

[57] ABSTRACT

An orbital tube welder is provided comprising a pair of tube clamping assemblies having dual clamping areas and an electrode carrying housing adapted for rotation around the clamping assemblies while applying a closing force thereon. The clamping assemblies advantageously accommodate irregular contours along the length of tubing being welded while assuring precise positioning and secure aligned clamping thereof during the welding operation by utilizing clamping jaws adjacent the weld and a spaced resilient aligning and clamping collar having a radial slot extending along the length thereof. Multiple adjustments are incorporated in both the housing and the individual clamping assemblies for precisely controlling alignment of the tubes being welded.

11 Claims, 6 Drawing Figures

INVENTOR
JOHN O. EMMERSON

BY Prutzman, Hayes, Kalb and Chilton
ATTORNEYS

CLAMPING AND WELDING ASSEMBLY

BACKGROUND AND SUMMARY OF THE INVENTION

The present invention relates generally to a welding device and is particularly directed to a new and improved clamping and welding assembly of the type wherein the welding electrode rotates relative to the members being welded.

In recent years there has been an increased demand for repetitive high-quality welding of both tubular and flat structures to provide not only the superior quality associated with careful and excellent workmanship but also the precision and accuracy frequently unattainable with the normal human hand-held deployment of the welding apparatus. In order to provide such constantly precise and superior quality welds it is necessary not only to control required subtle weld current variations while the electrode progresses through its complete weld path but also to assure accurate and precise alignment of properly prepared abutting surfaces.

When welding tubular members having deliberately imposed contour irregularities, such as bends, adjacent the surface being welded, it has been found that substantial alignment problems are encountered. Clamping jigs or similar devices used heretofore for straight tubing are unable to accommodate the contour variations and at the same time assure the accurate alignment necessary for producing the requisite quality weld.

Accordingly, it is a principal object of the present invention to provide a new and improved welding device adapted to achieve precise alignment of the abutting surfaces, appropriate pressure thereacross and precision alignment of the welding electrode on the center line of the abutting surfaces.

Another object of the present invention is to provide a welding device capable not only of precise alignment of the workpieces and superior quality welds on the members being joined, but of equal importance also exhibiting the ability to perform such functions when the members being joined have deliberately imposed distortions or irregularities which must be recognized and accommodated during the aligning process.

Still another object of the present invention is to provide a new and improved welding device of the type described which combines the clamping and welding functions in a single unit thereby guaranteeing precise alignment between the members being joined and maintaining these conditions during the pass of the electrode around the joint while preventing the imposition of stress-induced loads across the molten weld bead during the welding operation.

A further object of the present invention is to provide a welding device of the type described incorporating a rotatable housing for both supporting the electrode and applying controlled clamping pressure to the members being joined yet at the same time being capable of rapid assembly and disassembly from the members being joined irrespective of the length thereof and the irregular contour or distortions within these members.

Still a further object of the present invention is to provide a device of the type described which functions so as to precisely and accurately align the abutting surfaces of tubular members having deliberately imposed bends and distortions therein while at the same time providing a rotatable housing for imparting orbital travel to the electrode about the center line of the abutting surfaces. Included in this object is the provision for a clamping and welding device of the type described wherein the orbital housing additionally functions to control the clamping pressure applied across the surfaces being welded.

Another object of the present invention is to provide a device of the type described which is compact in size yet adapted for facile assembly and operation without the necessity for sophisticated controls, the device being capable of utilizing the rudimentary controls normally associated with welding equipment manufacture.

Another object of the present invention is to provide a device of the type described having cooperative driving engagement between the rotatable housing and the clamping assemblies to ensure rotational immobility between the members being welded.

Other objects will be in part obvious and in part pointed out in more detail hereinafter.

These and related objects are accomplished by providing a clamping and welding device comprised of a outer housing mounting a welding electrode and a pair of workpiece clamping assemblies mounted on the housing for movement relative thereto. Each of the clamping assemblies has clamping means for securely engaging the workpiece adjacent the surface being welded and adjustable aligning and retaining means spaced from said clamping means for precisely positioning workpiece surfaces being welded, the aligning and retaining means being adapted to accommodate nonlinear contour variations in the workpiece. The device additionally includes means for applying a closing force to the surfaces being welded during the welding operation and during movement of the housing relative thereto.

A better understanding of the objects, advantages, features, properties and relationships of the invention will be obtained from the following detailed description and the accompanying drawings which set forth an illustrative embodiment and are indicative of one way in which the principles of the invention are employed.

DESCRIPTION OF A PREFERRED EMBODIMENT

Figure 1:
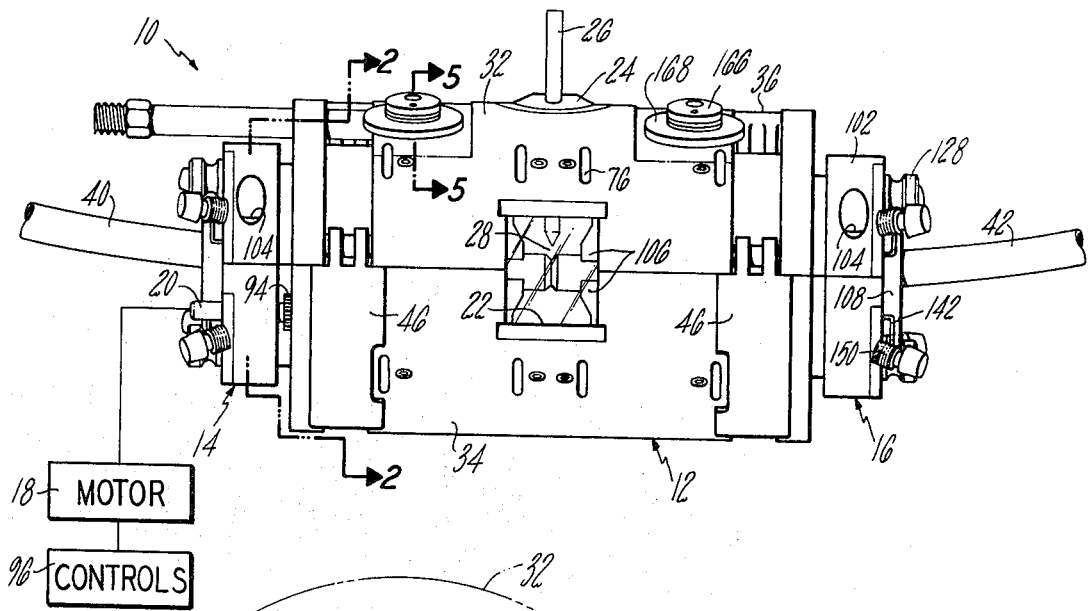
FIG. 1 is a front elevational view depicting one embodiment of the compact clamping and welding device of the present invention.

Referring now to the drawings in greater detail wherein like reference numerals indicate like parts throughout the several FIGS., the welding device of the present invention is shown in the form of an orbital tube welder 10 compressed of a generally cylindrical outer housing or barrel 12 completely circumscribing and enclosably retaining a pair of aligning and clamping assemblies 14 and 16 at opposite ends thereof. The housing 12, rotatably driven relative to the clamping assemblies by means of the motor 18 acting on the housing drive shaft 20, is provided with both a central observation port 22 for observing alignment of the workpieces and the welding operation and a suitable electrode mounting bushing 24. The bushing centrically mounts and controllably positions a welding electrode 26 at the central welding station 28 located generally between the aligning and clamping assemblies 14 and 16. Advantageously, the generally tubular barrel 12 is axially split so as to provide upper and lower housing segments 32, 34 of substantially the same size, the segments being hingedly connected by a pair of multi-pivot hinge clamps 36. As a result, the workpiece clamping assemblies 14, 16 and the tubular workpieces 40, 42 clamped therein can be readily mounted within the open housing 12 prior to the welding operation and, advantageously, the housing can be readily removed therefrom upon completion of the welding operation.

Figure 2:
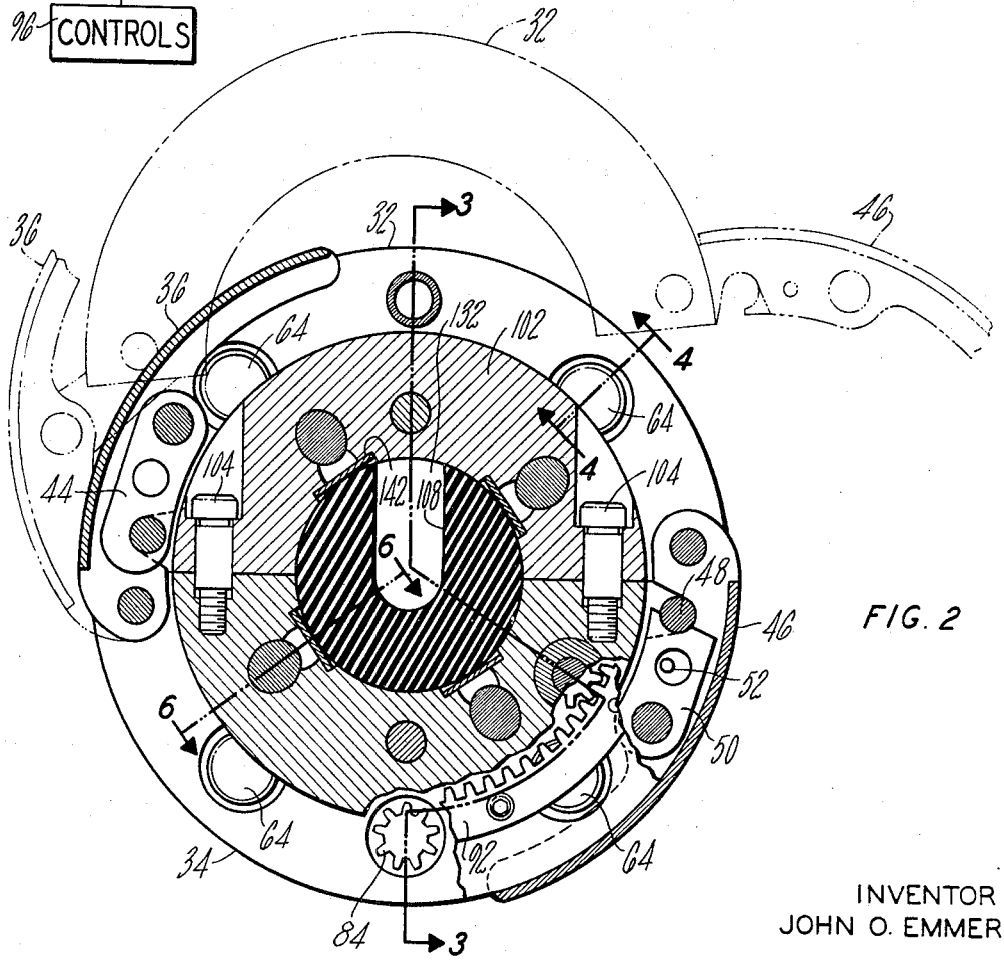
FIG. 2 is an enlarged end sectional view taken along the line 2—2 of FIG. 1, showing a portion of the tube aligning and clamping assembly of the present invention which the tubular workpieces removed, the housing being shown in phantom in its open position.

As best shown in FIG. 2, the hinge clamps 36 are pivotally mounted to the lower segment 34 of the barrel housing and include a toggle linkage 44 pivotally connecting the upper segment 32 to the clamps. Thus, the top half of the barrel housing not only can pivot relative to the lower half but also can be moved into spaced overlying relationship therewith by means of the toggle linkage. In this way greater flexibility of operation is provided while assuring full accessibility and adjustability within the device.

On the opposite side of the barrel housing from the hinge clamps 36 are a pair of pivotally mounted locking latches 46 rotatably mounted on the upper half 32 of the barrel housing and adapted for movement into locking engagement with the keepers 48 fixedly mounted on the lower half of the housing. The locking latches are further provided with locking links 50 having eccentric adjustment 52 thereon for controlling the closing pressure of the housing.

Figure 3:
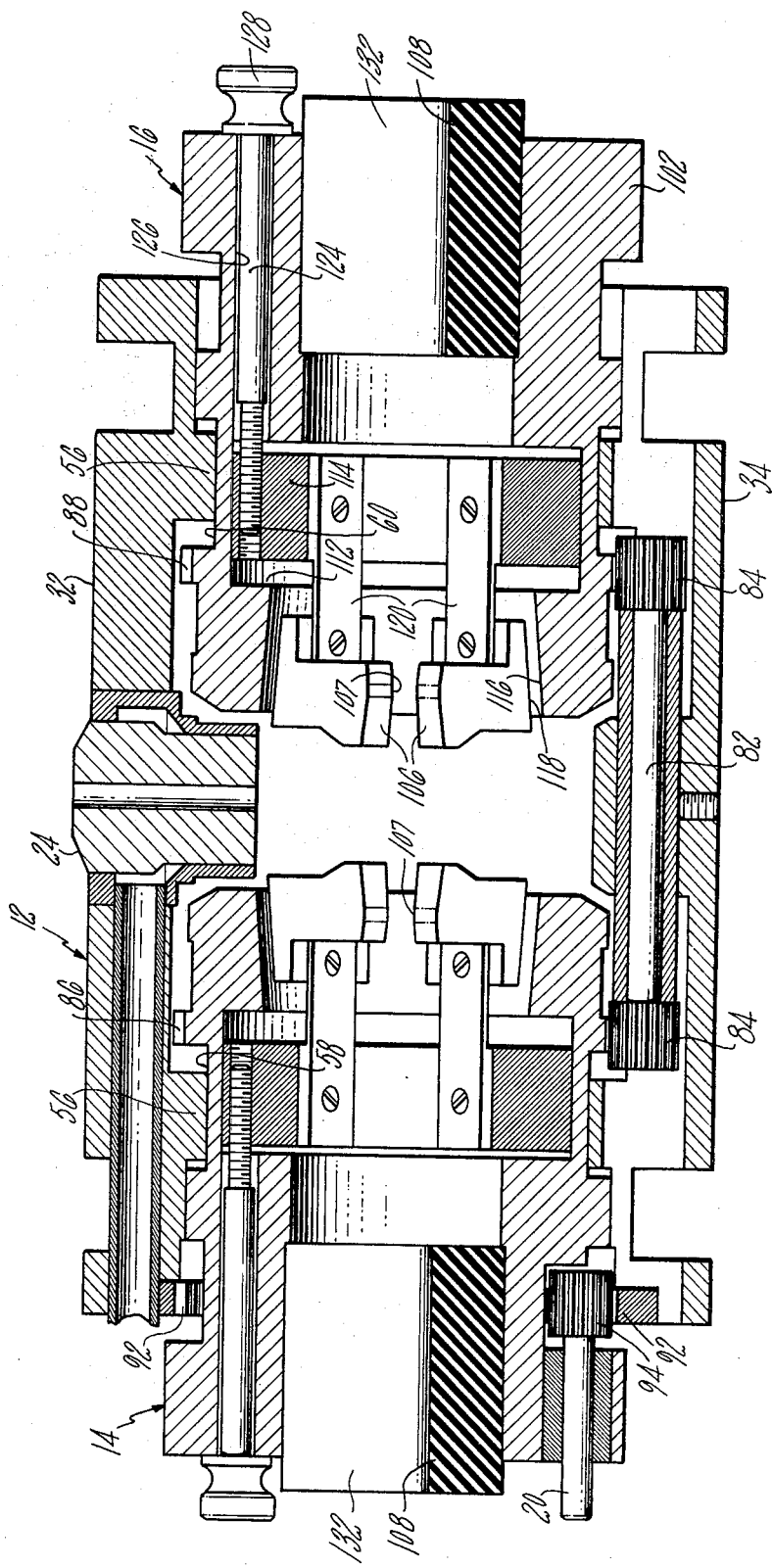
FIG. 3 is a sectional view taken along the line 3—3 of FIG. 2 illustrating certain features of the device's interior construction.
Figure 4:
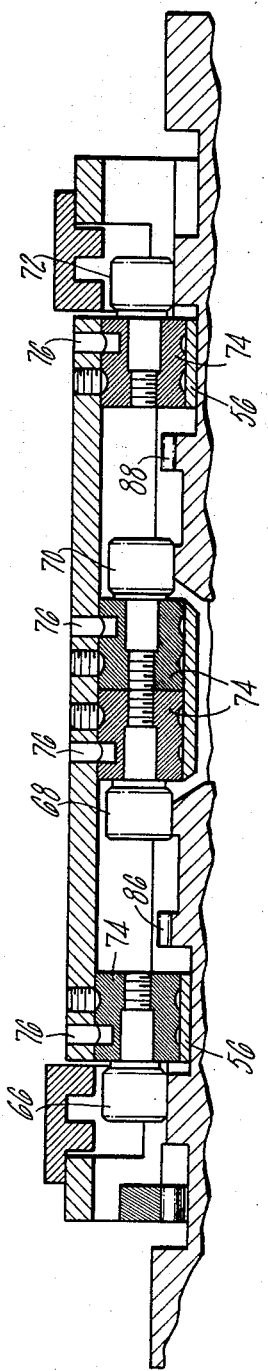
FIG. 4 is a sectional view taken along the line 4—4 of FIG. 2 illustrating one bank of adjustable bearings mounted on the rotatable housing for precisely positioning the clamping assemblies.

As best seen in FIG. 3 the barrel housing 12 also includes a pair of inwardly projecting ring-like bosses 56 spaced from each end of the housing and loosely interfitting within complementary exterior recesses 58, 60 in the respective spaced clamping assemblies 14, 16. Although the bosses 56 lock the clamping assemblies within the housing against axial removal therefrom, they also permit free rotational movement between the respective members. Facilitating this rotational movement between the barrel housing and the clamping assemblies are four banks 64 of bearing symmetrically spaced within the housing (see FIG. 2). As shown in FIG. 4, each bank 64 comprises four cam followers roller-type bearings 66, 68, 70, 72 mounted on opposite sides of the ring-like bosses 56 so that two bearings of each bank provide rolling contact with the clamping assembly held by the boss located therebetween. Each bearing is mounted eccentrically within a rotatably adjustable bushing 74 carried by the housing. Ports 76 within the housing 12 are provided to facilitate rotation of the bushings 74 axially spaced along the housing and thereby radially adjust the location of each bearing to assure proper axial alignment of the clamping assemblies rollably contacted thereby.

As mentioned, the upper half 32 of the barrel housing carries an electrode mounting bushing 24 for properly positioning the electrode 26 within the welding station 28. As shown in FIG. 2 and 3, the lower half 34 of the housing is provided with a drive connecting quill shaft or rod 82 extending axially along the lower half of the barrel housing in a position substantially diametrically opposed to the electrode mounting 24 for synchronizing the rotation of the clamping assemblies 14 and 16 relative to the housing 12. The synchronizing quill shaft 82 is provided on opposite ends with fixed pinions 84 adapted to mesh with ring gears 86, 88 on the outer periphery of the respective clamping assemblies, thereby assuring the synchronous rotational movement of both clamping assemblies relative to the housing and in this manner obviating the presence of torsional shearing forces that might be imposed across the workpiece during the welding operation, particularly at the molten weld bead. It will be appreciated that when large aligning forces are required to be imposed on the workpiece by the clamping and aligning assemblies and the barrel housing is caused to rotate relative to those assemblies, a torque may be developed between the barrel housing and the clamping assemblies in an amount sufficient to cause one clamping assembly to creep relative to the other. Thus, if one of the tubes being welded is secured against movement, such as by being attached to another structure, and that tube is being used as a support for the entire welding apparatus during its welding function, then the other tube of the weldment, being free to move and being held in position only by the orbital welder, might tend to move with the barrel housing in unrestrained fashion unless it is held in the manner described in the present invention. By utilizing the synchronizing quill shaft arrangement, it is guaranteed that no torsional loads will be imposed across the molten weld bead during the welding process and a substantially improved high quality weld is more readily assured.

The barrel housing 12 is additionally provided with a ring drive gear 92 at one end thereof meshing with a drive pinion 94 mounted on the drive shaft 20 carried within the clamping assembly 14. As shown in FIG. 1, the drive shaft 20 is suitably connected to a motor having appropriate controls 96 for regulating the rotational speed of the housing relative to the clamping assemblies. It will, of course, be appreciated that the rotation of the barrel housing is synchronized with the operating controls for the electrode so that the welding operation parameters are fully controlled during single or multiple passes of the electrode around the abutting surfaces of the workpieces.

With the exception of the drive shaft extending through assembly 14, the aligning and clamping assemblies illustrated are substantially identical in all respects and only one thereof will be described in detail. Each assembly provides a pair of spaced clamping locations, one of extremely short length immediately adjacent the tube surface being welded and the other of longer extent spaced from the first by a distance approximately equal to the length of the assembly. Each assembly is comprised of a substantially cylindrical tubular collet 102 which, like the barrel housing 12, is axially split to particularly facilitate disassembly from the tubular workpiece upon completion of the welding operation. Both halves of the split collet are securely fastened in place by a plurality of threaded members 104 or by similar connecting means such as toggle clamps similar to the outer barrel clamps. The two halves of the collet together form a cylindrical structure having a central cavity that houses both a set of radial clamping jaws 106 and a terminal contour-accommodating aligning and clamping collar 108. The generally cylindrical interior surface of the split collet is provided with an annular recess 112 for accommodating axial travel of a split ring support 114 for the clamping jaws 106. The innermost end of the collet 102 also is provided with an interior camming surface 116 which cooperates with tapered confronting surfaces 118 on each of the four clamping jaws 106 to effect secure engagement of the jaws with the tubular workpiece. Each jaw has a narrow workpiece-contacting area 107 of sufficiently short length to provide essentially line contact approaching a knife edge. The jaws are connected to the split ring support by individual spring-like connector strips 120 of a sturdy yet flexible nature for biasing the tapered surfaces 118 into engagement with the camming surface 116 on the collet body. A control rod 124 for the clamping jaws extends through an axial passage 126 in the collet body communicating with the annular recess 112 and is threadably connected to the support ring 114 for the jaws. A knob 128 on rod 124 engages the collet so that as the control rod is rotated the support ring 114 will move axially of the collet within the recess 112 causing the jaws to ride along the camming surface 116 of the collet body and radially close or open about the tubular workpiece. As best shown in FIG. 1 the clamping jaws 106 preferably engage the tubular workpiece at a position quite close to the end thereof being welded in order to minimize the effect of any curvature in the workpiece over a small distance from its abutting surface to the point where the jaws grasp the tube. Although the collet body and the jaw support ring are axially split so as to permit ready removal of the clamping assembly from the workpiece after the welding operation has been completed, it is generally preferred that the collet and jaws of the clamping assembly be in their assembled condition prior to insertion of the free end of the tubular workpiece therein. Thus, with the jaws at a fully open position the free end of the tubular workpiece is passed into its respective clamping assembly so that it extends only slightly beyond the four symmetrical clamping jaws. Rotation of the control rod with its head 128 against the end of the collet 102 so as to axially displace the support ring will cause the jaws to move radially inwardly into engagement with the tubular workpiece and provide a firm and secure grasp thereof. As mentioned, this operation is preferably carried out for each clamping assembly prior to mounting of the contour-accommodating collar 108 on the workpiece or mounting of the clamping assemblies within the barrel housing 12.

It is a particularly advantageous feature of the present invention that the welding device can accommodate workpieces having irregular contours or bends along the length thereof. This is due in part to the location of the clamping jaws 106 immediately adjacent the abutting surfaces being welded. However, to a greater degree it is due to the unique aligning collar 108 of the present invention. As shown in FIGS. 2 and 3, the aligning collar is a generally cylindrical member having an elongated slot 132 extending along the length thereof to a depth slightly below the central axis of the cylindrical collet within which it is mounted. The collar 108 is a firm yet resilient member preferably formed from flexible materials such as rubber and the like and is contoured so as to easily yet firmly fit within the exterior end of the collet. The slot 132 in the rubber aligning collar 108 facilitates its easy placement on the workpiece and its ready mounting within the collet of the clamping assembly with the slot oriented so as to accommodate the irregular contour of the workpiece.

Figure 6:
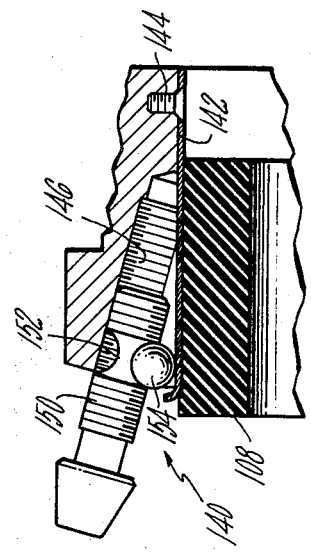
FIG. 6 is a sectional view taken along the line 6—6 of FIG. 2 illustrating a portion of one of the adjustable tube aligning and clamping assemblies utilized in accommodating the irregular contour of the members being joined.

Although the slotted collar 108 will accommodate a tubular workpiece of varying contour, it does not by itself necessarily provide the desired firm and secure gripping action necessary for the welding operation. It does, however, facilitate proper initial positioning of the workpiece so as to accurately and precisely align the confronting surfaces of the workpieces after both clamping assemblies are mounted within the barrel housing. In order to effect precise alignment and secure retention in an aligned position, the clamping assembly is provided with four equally spaced adjustment screw assemblies 140 (FIG. 6) acting on the resilient collar 108 and urging it into firm retaining engagement with the tubular workpiece. Each screw assembly 140 includes an axially extending metal strip 142 of spring steel or the like secured at its innermost end to the inner surface of the collet by a connector 144 so that the remainder of the leaf spring is free to flex inwardly and radially deform the rubber collar 108 into firm compressive engagement with the tubular workpiece. A threaded aperture 146 in the end of the collet 102 is disposed at a slight angle to the axis of the collet and communicates with the leaf spring 142. The aperture 146 threadably receives a thumb screw 150 adapted for threadable movement into and out of the aperture. A concave annular raceway 152 provided midway along the thumb screw 150 cooperates with a drive ball 154 positioned therein in engagement with a leaf spring, so that as the thumb screw 150 is threadably driven into the aperture 146, the ball 154 will press against the leaf spring 142 causing it to move radially inwardly against the collar for compressive engagement thereof with the tubular workpiece positioned therein.

It will be appreciated that due to the substantial curvature of the tubular workpiece the center line thereof digresses substantially from the center line of the aligning collar. However, the notched collar of the present invention advantageously accommodates a wide range of possible excursions within the workpiece and at the same time provides for imposing alignment forces on the workpiece to guarantee precise alignment of the tube ends of the weldment. If the tubular workpiece is of slightly smaller diameter, the rubber collar is initially brought into firm gripping engagement with the workpiece by adjustment of the hand screws 150. Thereafter, the operator mounts the clamping assemblies within the housing 12 and visually observes the alignment of abutting surfaces through the observation port 22 in the front of the barrel housing. This alignment is effected partially by the banks 64 of bearings acting on the collets 102 and partially by the aligning screw assemblies 140 causing appropriate displacement of the rubber collars 108 in any radial direction selected by the operator.

Thus the arrangement of this present invention provides for precise adjustment potentials without imposing large travel requirements in order to accommodate the curvature or irregularity of the workpiece. It will, of course, be appreciated that where the workpieces are substantially straight members, the flexible collar may be replaced by a metal collar, notched or unnotched, to generate the desired longer clamping contact and positive and secure aligning force on the workpiece.

Figure 5:
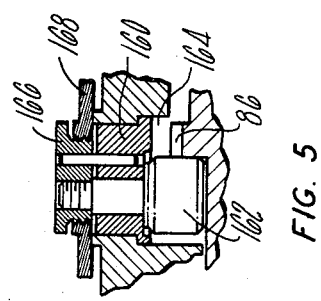
FIG. 5 is a sectional view taken along the line 5—5 of FIG. 1 illustrating one of the adjustable controls for exerting axial clamping pressure across the abutting surfaces of the members being joined.

It will be appreciated that as the clamping jaws 106 are tightened about the workpiece the confronting workpiece surfaces may be slightly separated or may not be in surface contact under the appropriate static pressure. Accordingly, in order to apply the appropriate pressure across the abutting surfaces and at the same time effect precise alignment with the electrode, the barrel housing 12 is provided with axial adjustment means for adjusting the axial position of the clamping assemblies 14 and 16. As best seen in FIGS. 1 and 5 the axial adjustment feature of the welding device of the present invention takes the form of a pair of rotatable bushings 160 mounted within the housing on opposite sides of the electrode mount 24. These bushings 160 eccentrically mount a pair of cam follower type bearings 162 positioned so as to engage the outward side 164 of the ring gears 86, 88 on the tubular collets of the respective clamping assemblies 14, 16. Thus, by rotation of the bushings 160 within the housing, the bearings act against the sides 164 of the ring gears and apply a closing axial force on the opposed clamping assemblies. It will, of course, be appreciated that in this way the abutting surfaces of the workpieces can be caused to move in either direction along the longitudinal axis of the housing so as to position the abutting surfaces at an appropriate location relative to the adjustable electrode 26 while at the same time applying proper pressure to the abutting surfaces being welded. Thereafter the hand screws 166 used for rotating the bearings 162 can be suitably locked in place by tightening the locking rings 168 provided thereon so as to assure proper retention of that position during the rotational movement of the barrel housing.

As will be apparent to persons skilled in the art, various modifications, adaptations and variations of the foregoing specific disclosure can be made without departing from the teachings of the present invention.

I claim:

1. A clamping and welding device for precisely positioning a pair of workpieces and securing the workpiece surfaces in aligned abutting relationship comprising welding means including a welding electrode, a housing adapted for mounting a welding electrode and a pair of workpiece clamping assemblies mounted on the housing for synchronous movement relative thereto, each of said assemblies having clamping means for securely engaging the workpiece adjacent the surface being welded and adjustable aligning and retaining means spaced from said clamping means for precisely positioning said workpiece surfaces, said aligning and retaining means being adapted to accommodate nonlinear contour variations in each workpiece, said housing including means for moving the electrode relative to the clamping assemblies and for applying a closing force to the surfaces being welded during the welding operation and during movement of the housing relative thereto, said clamping assembly being provided with a flexible aligning collar spaced from the surface being welded and adapted for compressively engaging the workpiece despite nonlinear contour variations therein and adjustable aligning means selectively operative on the flexible collar to urge the collar into compressive engagement with the workpiece and effect adjustable positioning thereof.

2. The clamping and welding device of claim 1 including interconnecting drive means between the clamping assemblies for assuring synchronous movement thereof relative to the housing, said interconnecting means being operative to obviate the imposition of stress-induced loads across the molten weld bead of the abutting surfaces during the welding operation.

3. The device of claim 2 wherein the interconnecting means includes a rotatable connecting shaft mounted on the housing for movement therewith and synchronous drive means on each clamping assembly cooperating with the shaft to prevent relative movement between the assemblies, said device further including a drive input means operatively connected to the housing for moving the housing relative to the clamping assemblies.

4. The clamping and welding device of claim 1 wherein the clamping assembly includes a collet, a plurality of clamping jaws movable toward and away from the workpiece adjacent the surface being welded, a support for the jaws movably retained by the collet and jaw drive means interconnecting said collet and said support for imparting to the jaws movement toward and away from the workpiece.

5. The device of claim 1 wherein the collar is a resiliently deformable cylindrical member having a radial slot therein along the length thereof extending from its outer surface to adjacent the central axis thereof.

6. The clamping and welding device of claim 1 wherein the housing and the clamping assemblies are generally cylindrical, axially split members capable of easy removal from the workpiece upon completion of the welding operation.

7. The device of claim 6 wherein the clamping assemblies are provided with ring-like shoulders projecting from the exterior surfaces thereof and the means for applying a closing force to the workpieces includes bearings eccentrically mounted within the housing and engageable with said shoulders for applying axial pressure to the assemblies.

8. The clamping and welding device of claim 1 wherein the housing is a cylindrical member retainably enclosing the clamping assemblies and includes adjustable positioning means for positioning the clamping assemblies relative to each other and to the housing.

9. The device of claim 1 wherein the clamping assembly includes a tubular collet having an interior camming surface at one end, a plurality of symmetrically spaced clamping jaws having cam follower portions cooperating with the camming surface of the collet to effect radial movement of the jaws, a support ring for the jaws retainably mounted within the collet for limited axial movement therealong, said jaws being secured to the ring for axial movement therewith, and ring drive means on the collet for displacing the ring axially to effect radial movement of the jaws, said clamping assembly further including a flexible aligning collar mounted within the collet at the end thereof opposite said one end in spaced axial relationship to the clamping jaws and a plurality of adjustable screw assemblies for compressively urging the collar into engagement with the workpiece.

10. A clamping and welding device for precisely positioning a pair of workpieces and securing the workpiece surfaces in aligned abutting relationship comprising welding means including a welding electrode, a housing adapted for mounting a welding electrode in fixed relationship therewith and a clamping assembly for movement relative thereto, said assembly having clamping means securely engaging the workpiece adjacent the surface being welded and adjustable aligning and retaining means spaced from said clamping means for precisely positioning the surface of the workpiece held thereby, said housing including means for moving the clamping assembly relative to the housing and for applying a closing force to the surfaces being welded during the welding operation and during movement of the housing relative thereto, said clamping assembly being provided with a flexible aligning collar spaced from the surface being welded and adapted for compressively engaging the workpiece despite nonlinear contour variations therein and adjustable aligning means selectively operative on the flexible collar to urge the collar into compressive engagement with the workpiece and effect adjustable positioning thereof.

11. The device of claim 10 wherein the clamping assembly is provided with at least one ring-like shoulder projecting from the exterior surface thereof and the means for applying a closing force to the workpiece includes a bearing eccentrically mounted within the housing and engageable with said shoulder for applying axial pressure to the workpiece held by the assembly.

* * * * *